United States Patent
Bunting et al.

(10) Patent No.: US 12,202,596 B2
(45) Date of Patent: Jan. 21, 2025

(54) AERODYNAMIC ROTARY INTERFACE

(71) Applicant: Lockheed Martin Corporation, Bethesda, MD (US)

(72) Inventors: Colin Kemater Bunting, Branford, CT (US); Patrick Ormande Bowles, Glastonbury, CT (US); Peter F. Lorber, Southbury, CT (US); Brian Ernest Wake, Monroe, CT (US); Byung-Young Min, Trumbull, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 261 days.

(21) Appl. No.: 17/834,550

(22) Filed: Jun. 7, 2022

(65) Prior Publication Data
US 2023/0391448 A1    Dec. 7, 2023

(51) Int. Cl.
*B64C 27/32* (2006.01)
*B64C 27/10* (2023.01)

(52) U.S. Cl.
CPC .............. *B64C 27/32* (2013.01); *B64C 27/10* (2013.01)

(58) Field of Classification Search
CPC ......... B64C 27/10; B64C 27/32; B64C 11/02; B64C 11/14; B64C 11/48
See application file for complete search history.

(56) References Cited

U.S. PATENT DOCUMENTS

| | | |
|---|---|---|
| 10,167,079 B2 | 1/2019 | Weiner et al. |
| 10,232,929 B2 | 3/2019 | Bowles et al. |
| 10,899,438 B2 | 1/2021 | Hunter et al. |
| 2020/0223536 A1 | 7/2020 | Egolf et al. |

FOREIGN PATENT DOCUMENTS

| | | | | |
|---|---|---|---|---|
| CN | 112249305 A | * | 1/2021 | |
| EP | 2727832 A1 | * | 5/2014 | ............. B64C 27/04 |
| EP | 3693267 B1 | * | 9/2022 | ............. B64C 11/02 |

OTHER PUBLICATIONS

Machine Translation of CN-112249305-A, Li Q, Jan. 21, 2022 (Year: 2022).*

* cited by examiner

*Primary Examiner* — Tien Q Dinh
*Assistant Examiner* — Katherine June Bolek
(74) *Attorney, Agent, or Firm* — Michael Best & Friedrich LLP

(57) ABSTRACT

A rotor assembly including a fixed fairing including an interface portion and a hub fairing including a depression. The depression is configured to receive at least a portion of the interface portion. The hub fairing is rotatable relative to the fixed fairing.

17 Claims, 5 Drawing Sheets

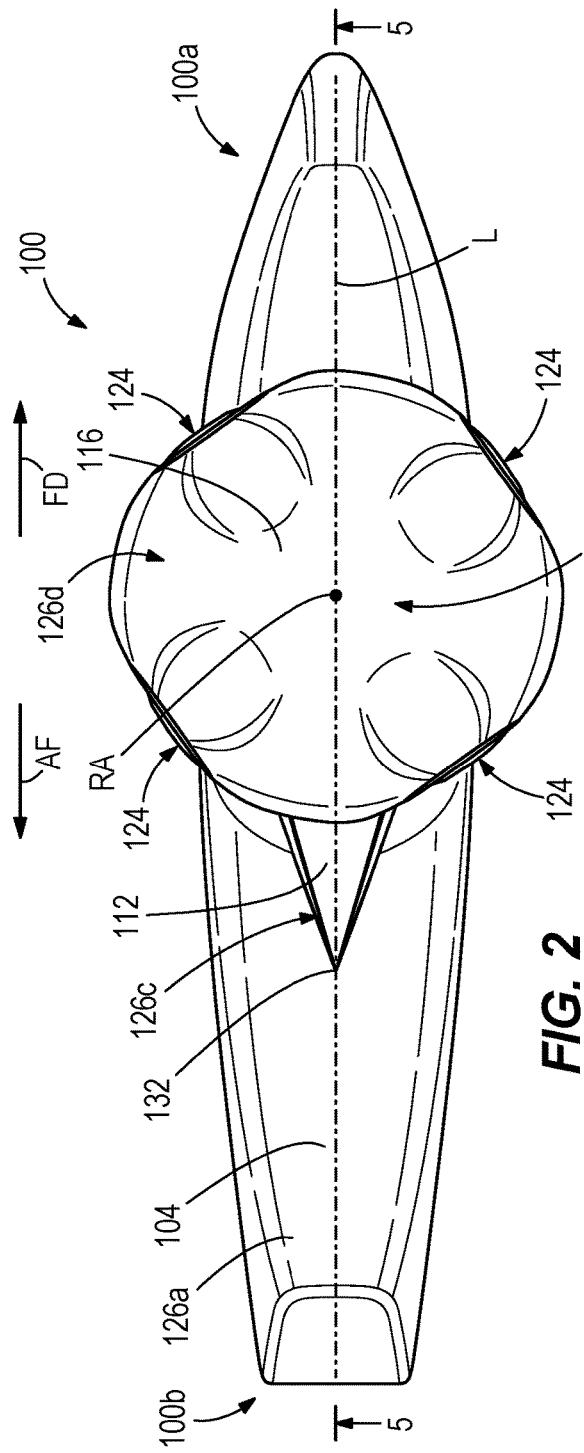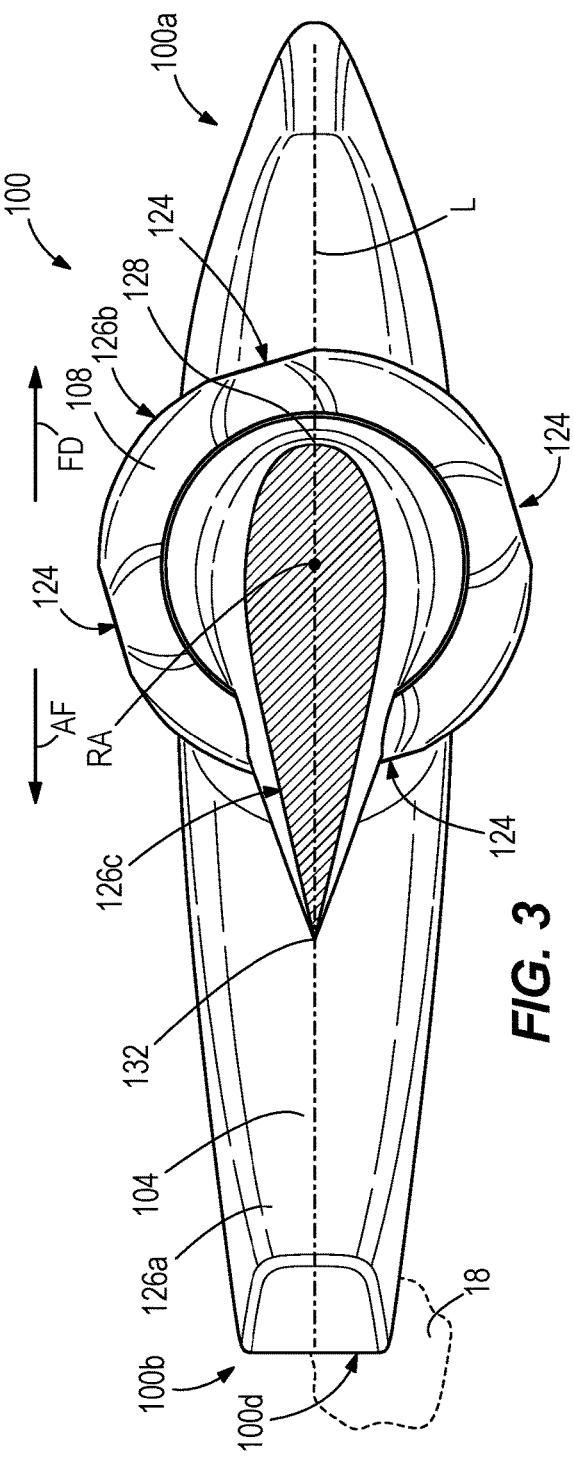

AERODYNAMIC ROTARY INTERFACE

FIELD OF INVENTION

Embodiments described herein relate to an aerodynamic rotary interface and, in particular, to an aerodynamic rotary interface for use in an aircraft.

BACKGROUND

Known rotor systems define axial clearances between adjacent rotary fairings. This axial clearance disrupts fluid flow as fluid passes the rotor system. Disrupted fluid flow increases drag and decreases the efficiency of the rotor.

SUMMARY

Embodiments described herein provide a rotor assembly, where the rotor assembly includes a fixed fairing including an interface portion and a hub fairing including a depression configured to receive at least a portion of the interface portion. The hub fairing is rotatable relative to the fixed fairing.

Embodiments described herein provide an aircraft, where the aircraft includes an airframe, a power source, a gearbox, a fixed fairing, and a hub fairing. The power source is configured to generate power. The fixed fairing is fixed to the airframe and includes an interface portion. The hub fairing includes a depression configured to receive at least a portion of the interface portion. The hub fairing is coupled to the drive shaft for rotation therewith relative to the fixed fairing.

Embodiments described herein provide a rotor assembly, where the rotor assembly includes a fixed fairing, a first hub fairing, a fixed shaft fairing, and a second hub fairing. The fixed fairing includes an interface portion. The first hub fairing includes a first depression and a second depression. The fixed shaft fairing includes a first interface portion and a second interface portion. The second hub fairing includes a depression. The depression of the second hub fairing is configured to receive at least a portion of the second interface portion of the fixed shaft fairing. The second depression of the first hub fairing is configured to receive at least a portion of the first interface portion of the shaft fairing. The fixed fairing is fixed relative to the fixed shaft fairing. The first hub fairing and the second hub fairing are rotatable relative to the fixed fairing and the fixed shaft fairing.

Other aspects will become apparent by consideration of the detailed description and accompanying drawings.

BRIEF DESCRIPTION OF THE DRAWINGS

FIG. 2 depicts a top view of a rotor assembly of the rotary wing aircraft of FIG. 1.

FIG. 3 is a cross-sectional view of the rotor assembly of FIG. 2 taken along section line 3-3 in FIG. 1.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
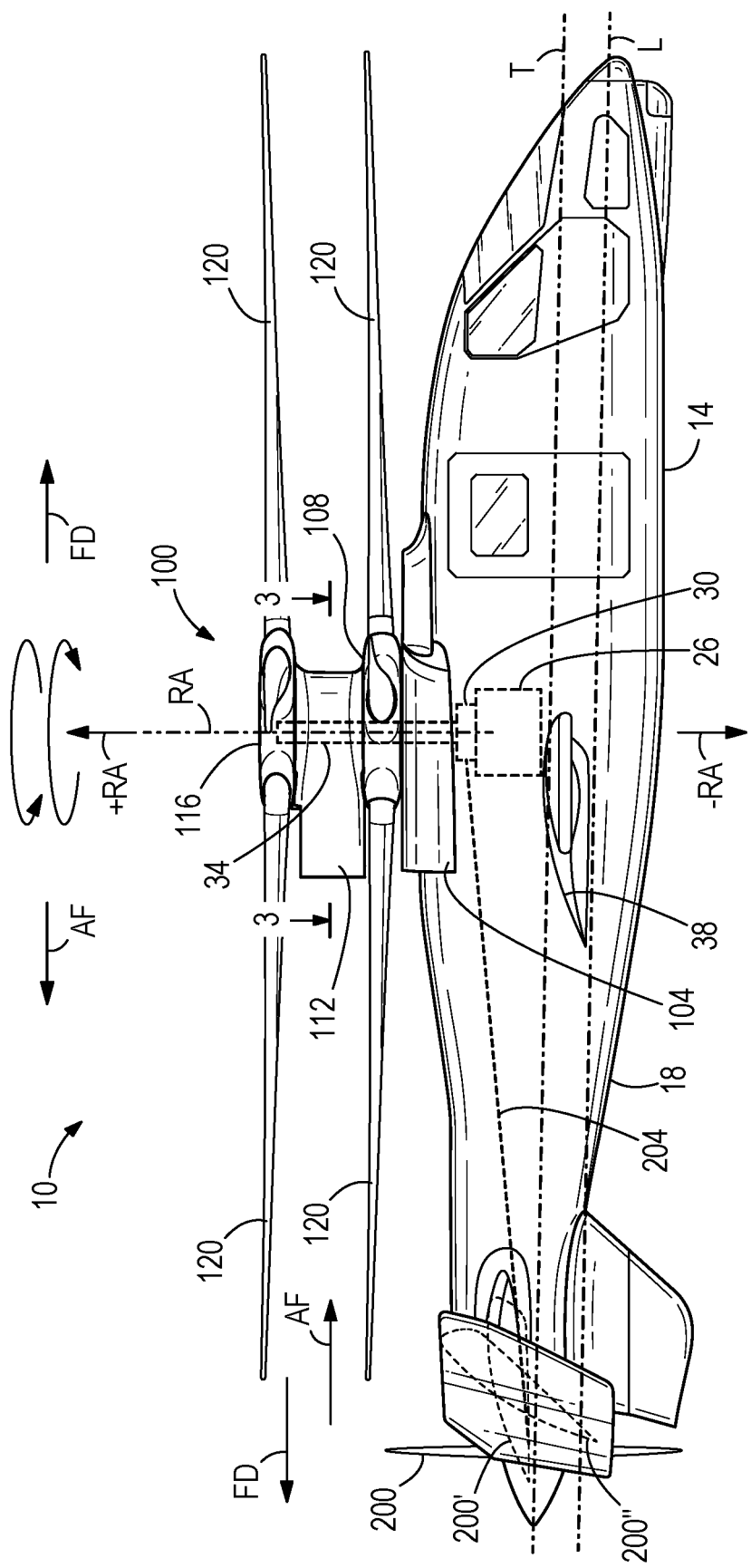
FIG. 1 depicts a schematic of a rotary wing aircraft according to an exemplary embodiment.
Figure 4:
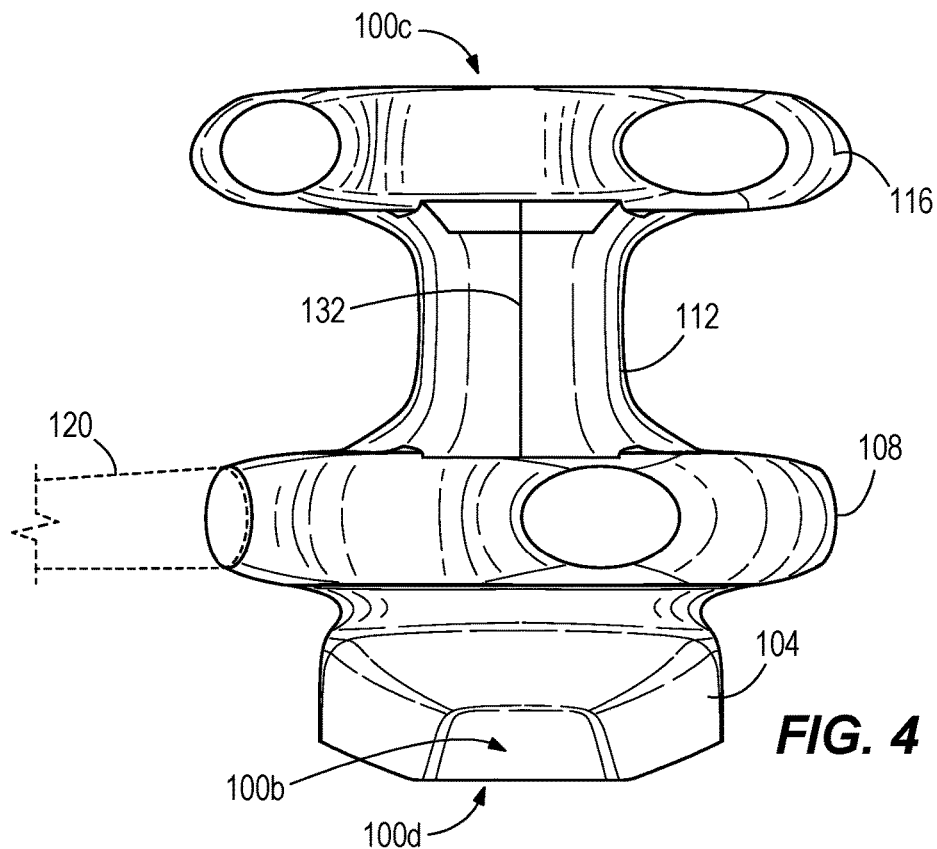
FIG. 4 is a rear view of the rotor assembly of FIG. 2.

FIG. 1 depicts an exemplary embodiment of a rotary wing, vertical takeoff and land (VTOL) aircraft 10. The aircraft 10 includes an airframe 14 having a body portion 18 and a tail 22. The tail 22 extends from the body portion 18. A dual, counter rotating, coaxial main rotor assembly 100 is coupled to the body portion 18 of the airframe 14. As will be described in detail below, the main rotor assembly 100 rotates about a rotor axis RA. The rotor assembly 100 may be used in other types of aircraft 10 such as non-vertical takeoff and land (non-VTOL) aircraft 10. For example, the rotor assembly 100 may be used in single main rotor helicopters, tandem rotor helicopters including offset rotor assemblies, tandem intermeshing rotor helicopters including overlapping rotor assemblies, coaxial helicopters including a plurality of rotary wings aligned along a common axis, and the like. The rotor assembly 100 may also be used for other transport vehicles such as automobiles, boats and the like. The rotor assembly 100 may also be used for other uses not relating to transport vehicles.

In an exemplary embodiment (the VTOL aircraft 10 of FIG. 1), the airframe 14 includes two seats for flight crew (e.g., pilot and co-pilot) and six seats for passengers. However, an airframe 14 having another configuration (e.g., single seat airframes, airframes configured for transporting both flight crew and passengers) is within the scope of the present disclosure. The main rotor assembly 100 is driven by a power source 26. The power source 26 may be, for example, one or more engines 26. The power source 26 may transmit on-board electrical energy (e.g., from a battery or other electrical energy source) or chemical energy (e.g., from fuel or another chemical energy source) into mechanical energy (i.e., torque).

The power source 26 is capable of transmitting energy to the main rotor assembly 100. The power source 26 is coupled to the main rotor assembly 100 via a gearbox 30 and a drive shaft 34. The power source 26 is coupled to the gearbox 30, and the gearbox 30 is coupled to the drive shaft 34, which is coupled to the rotor assembly 100. Upon activation of the power source 26, the power source 26 generates power that is transmitted to the rotor assembly 100 through the gearbox 30 and the drive shaft 34. Accordingly, the rotor assembly 100 can utilize the mechanical energy generated by the power source 26 to generate at least one of thrust and lift forces to counteract and/or overcome drag and weight forces acting upon the aircraft 10. Accordingly, the aircraft 10 can hover in place or be maneuvered to a desired position.

In some embodiments, the aircraft 10 may include a wing 38 in addition to the rotor assembly 100 and an auxiliary propeller 200. The illustrated wing 38 includes a cross-sectional profile in the shape of an airfoil. The airfoil shape, size, and length of the wing 38 may be selected to optimize flight of the aircraft 10.

The illustrated aircraft 10 may further include the auxiliary propeller 200. The illustrated auxiliary propeller 200 is positioned on the tail 22 and is spaced from the body 18. The auxiliary propeller 200 may be coupled to the gearbox 30. In other embodiments, the auxiliary propeller 200 may be coupled to a dedicated power source 26 and a dedicated gearbox 30. The illustrated auxiliary propeller 200 is coupled to the gearbox 30 via an auxiliary drive shaft 204. The power source 26 may simultaneously provide power (e.g., mechanical energy) to the rotor assembly 100 and the auxiliary propeller 200 via the gearbox 30. In other modes of operation (e.g., while hovering in place), the gearbox 30 may drive only one of the rotor assembly 100 and the auxiliary propeller 200.

The auxiliary propeller 200 may be movable between a thrust orientation (illustrated as 200, FIG. 1) in which the propeller 200 generates thrust in a forward direction FD of the aircraft 10, a lift orientation (illustrated as 200', FIG. 1) in which the propeller 200' generates lift in an upward direction +RA, and an intermediate orientation (200", FIG. 1) in which the propeller 200" generates both thrust in the forward direction FD and lift in the upward direction +RD. Depending on the orientation (i.e., yaw, pitch, roll) of the aircraft 10 during flight, the propeller 200 may generate varying combinations of lift and thrust independent of the orientation of the propeller 200. The presence of such a movable auxiliary propeller 200 classifies the illustrated aircraft 10 as a VTOL aircraft 10. As previously mentioned, the rotor assembly 100 may be provided on other aircraft 10.

The auxiliary propeller 200 may be mounted to the rear of the tail 22, and may be oriented along a translational thrust axis T in the thrust position. The thrust axis T is oriented substantially horizontal and parallel to a longitudinal axis L, which is generally defined through the airframe 14. The auxiliary propeller 200 may thus provide thrust for high-speed flight. The auxiliary propeller 200 may provide thrust in the forward direction FD, or in an opposite rearward direction. In the illustrated and above-scribed thrust position, the translational thrust axis T corresponds to the axis of rotation of auxiliary propeller 200 with the auxiliary propeller 200 being configured to provide forward-facing thrust in the forward direction FD. While shown in the context of a pusher-prop configuration, it is understood that the propeller 200 could also be more conventional puller-prop. The described propeller 200 is variably facing in two dimensions, and can be repositioned between the thrust orientation, the lift orientation, and the intermediate orientation. Other propellers 200 may be variably facing in three dimensions so as to provide yaw control in addition to or instead of pitch and roll control. The size (e.g., diameter) and the shape (e.g., pitch) of the propeller 200 may be selected to optimize flight of the aircraft 10. Any such system or other translational thrust systems may alternatively or additionally be utilized. Alternative translational thrust systems may include different propulsion forms, such as jet engines.

With continued reference to FIG. 1, the rotor assembly 100 includes a pylon fairing 104, a lower hub fairing 108 (i.e., a first hub fairing), a shaft fairing 112, and an upper hub fairing 116 (i.e., a second hub fairing). In the illustrated embodiment, each of the lower hub fairing 108 and the upper hub fairing 116 includes a plurality of blades 120 coupled thereto. The lower hub fairing 108 and the upper hub fairing 116 may each be coupled to the drive shaft 34 for rotation therewith upon excitation of the power source 26. The lower hub fairing 108 and the upper hub fairing 116 are each aligned along the rotor axis RA, and are each configured to rotate about the rotor axis RA. The size (e.g., diameter) and the shape (e.g., pitch) of the propeller 200 may be selected to optimize flight of the aircraft 10. Similarly, the size (e.g., diameter) and the shape (e.g., pitch) number of blades 120 coupled to each hub fairing 108, 116 may be selected to optimize flight of the aircraft 10.

In the illustrated embodiment, the blades 120 are connected to the rotor assembly 100 in a hingeless manner, also referred to as a rigid rotor system. The illustrated rotor assembly 100 is a coaxially stacked system having a plurality of blades 120 coupled to the lower hub fairing 108 and a plurality of blades 120 coupled to the upper hub fairing 116. The lower hub fairing 108 and the upper hub fairing 116 are coaxial with the rotation axis RA. A particular aircraft 10 or rotor assembly 100 may be otherwise configured. For example, other rotary-wing aircraft such as aircrafts 10 including non-coaxial rotor blades 120 are possible.

In some embodiments, the upper hub fairing 116 may be driven in a first direction (e.g., clockwise CW) about the rotor axis RA, and the lower hub fairing 108 may be driven in an opposite second direction (e.g., counter-clockwise CCW) about the rotor axis RA. In other words, the lower hub fairing 108 an the upper hub fairing may be counter-rotating. However, other embodiments are envisioned including both the upper hub fairing 116 and the lower hub fairing 108 rotating in the same direction (e.g., clockwise CW).

FIG. 2 illustrates a top view of the rotor assembly 100. FIG. 2 shows an outer surface 126d of the upper hub fairing 116, an outer surface 126c of the shaft fairing 112, and an outer surface 126a of the pylon fairing 104. FIG. 3 further illustrates an outer surface 126b of the lower hub fairing 108. The outer surfaces 126a-126d come into contact with fluid particles (e.g., air) while the aircraft 10 is flown. While the aircraft 10 moves along the forward direction FD, air particles contact the outer surfaces 126a-126d in an airflow direction AF. The airflow direction AF is opposite the forward direction FD while the aircraft 10 translates along the forward direction FD. The aircraft 10 may be movable in other directions. For example, the aircraft 10 may be movable in a reverse direction in which the aircraft 10 travels along the airflow direction AF (as illustrated in FIG. 1), and airflow may travel along the forward direction FD (as illustrated in FIG. 1). Generally speaking, as air or other fluid particles contact the rotor assembly 100, drag is induced that opposes the airflow direction AF. Higher amounts of drag require higher thrust force to be counteracted and/or overcome to produce desired movement of the aircraft 10.

With continued reference to FIG. 2, the upper hub fairing 116 includes a plurality of blade interfaces 124. The blade interfaces 124 are configured to secure the blades 120 to the upper hub fairing 116. The illustrated upper hub fairing 116 includes four evenly circumferentially (e.g., by 90 degrees) blade interfaces 124. Similarly, FIG. 3 illustrates the lower hub fairing 108 including a plurality of blade interfaces 124.

As previously mentioned, the upper hub fairing 116 and the lower hub fairing 108 are coupled to the drive shaft 34 for rotation therewith. Upon rotation of the drive shaft 34, the lower hub fairing 108 and the upper hub fairing 116, and thus the blades 120, are rotated to generate a desired lift and/or thrust force depending in part on the orientation (i.e., roll, pitch, yaw) of the aircraft 10.

With continued reference to FIG. 3, the shaft fairing 112 includes a leading edge 128 and a trailing edge 132. During movement of the aircraft 10 in the forward direction FD, airflow passing along the airflow direction AF first passes the leading edge 128, flows around the outer surface 126c of the shaft fairing 112, and passes the trailing edge 132. As viewed in FIG. 3, a cross-sectional view taken perpendicular to the rotary axis RA and through the shaft fairing 112, the outer surface 126c of the shaft fairing 112 has a cross-sectional profile in the shape of an airfoil. In the illustrated embodiment, the rotary axis RA passes through the airfoil shape and the outer surface 126c of the shaft fairing 112. The illustrated outer surface 126c defines a neutral airfoil shape centered on either side of the longitudinal axis L. The airfoil shape, size, and length of the shaft fairing 112 between the leading edge 128 and the trailing edge 132 (i.e., chord length) may be selected to optimize flight of the aircraft 10.

Figure 5:
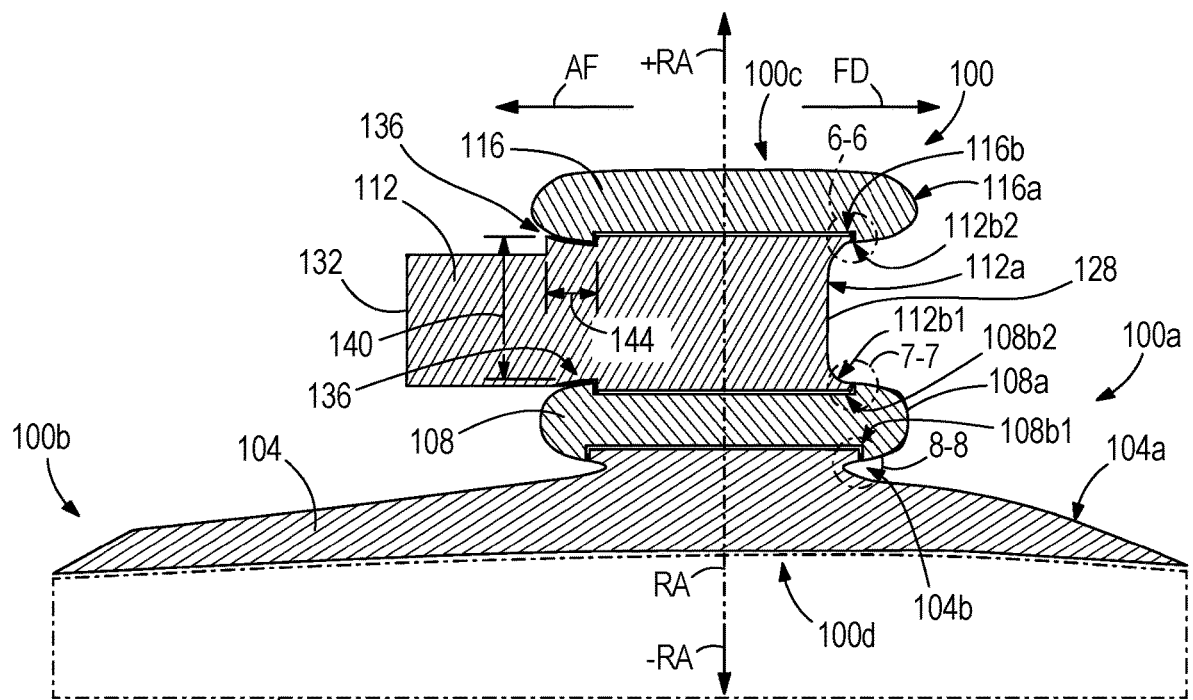
FIG. 5 is a cross-sectional view of the rotor assembly taken along section line 5-5 in FIG. 2.

As best illustrated in FIG. 5, the outer surface 126c of the shaft fairing 112 includes a flared portion 136 having variable height 140 along a length 144 thereof. The height 140 extends in a direction along the rotational axis RA. The length 144 extends in a direction along the with respect to the rotational axis RA along the rotational axis RA. The illustrated outer surface 126c includes flared portions 136 at opposite axial ends thereof. In other words, the outer surface 126c includes one flared portion 136 adjacent the lower hub fairing 108, and another flared portion 136 adjacent the upper hub fairing 116. The flared portions 136 may provide a smooth transition between the shaft fairing 112 and the hub fairings 108, 116 for airflow particles passing along the airflow direction AF to pass from the leading edge 128 to the trailing edge 132 without sudden changes in velocity (thus reducing drag) induced by passage of the airflow in the airflow direction AF adjacent the lower hub fairing 108 and/or the upper hub fairing 116. Otherwise shaped flared portions 136, including convex shapes are possible.

FIG. 5 illustrates the rotor assembly 100 as a whole. The rotor assembly 100 has a front end 100a, an opposite rear end 100b, a top end 100c, and an opposite bottom end 100d. The ends 100a-100d of the rotor assembly may be described differently depending on the orientation of the aircraft 10 relative to the ground. The names of the ends 100a-100d described herein are exemplary and generally relate to a typical orientation of the aircraft 10 relative to the ground. The bottom end 100d of the rotor assembly 100 is be coupled to the airframe 14. The rotor assembly 100 may, in some embodiments, be otherwise fixed to the aircraft 10 by a component of the aircraft 10 other than the airframe 14. More specifically, the pylon fairing 104 is fixedly coupled to the airframe 14. The lower hub fairing 108 is rotatably coupled to the pylon fairing 104. The shaft fairing 112 is fixedly coupled to the pylon fairing 104 and/or the airframe 14. The upper hub fairing 116 is rotatably coupled to the shaft fairing 112.

Figure 8:
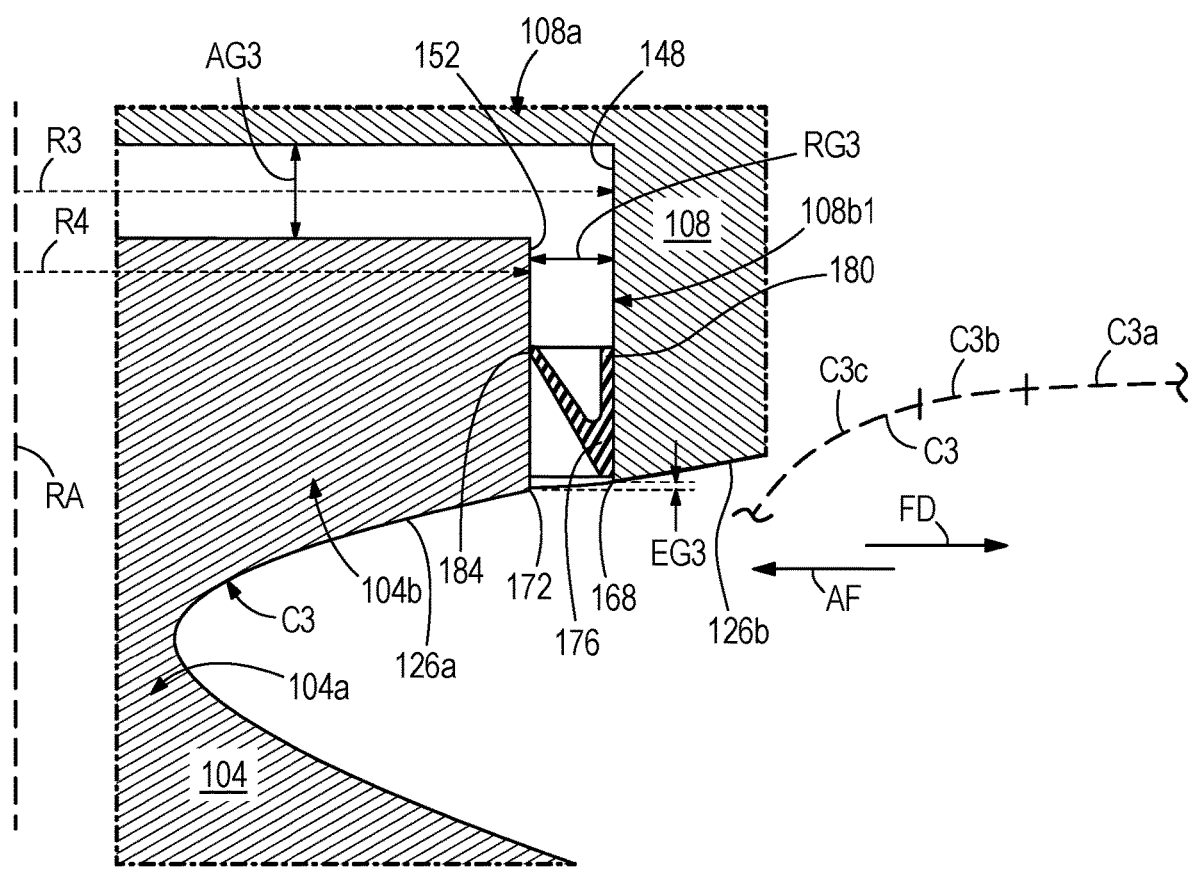
FIG. 8 is an enlarged view of a portion of the rotor assembly taken along section line 8-8 in FIG. 5.

Each of the pylon fairing 104, lower hub fairing 108, shaft fairing 112, and upper hub fairing 116 includes a body portion 104a, 108a, 112a, 116a. With reference to FIGS. 5 and 8, the pylon fairing 104 further includes an interface portion 104b projecting from the body 104a of the pylon fairing 104 in the upward direction +RA. The illustrated interface portion 104b is generally cylindrical in shape.

With continued reference to FIGS. 5 and 8, the lower hub fairing 108 further includes a first depression 108b1 and a second depression 108b2. In the illustrated embodiment, the first depression 108b1 and the second depression 108b2 are each generally cylindrical in shape. The first depression 108b1 is configured to receive at least a portion of the interface portion 104b of the pylon fairing 104. The first depression 108b1 is positioned closer to the bottom end 100d of the rotor assembly 100 when compared to the second depression 108b2. The first depression 108b1 extends in the upward direction +RA into the body portion 108a of the lower hub fairing 108. The second depression 108b2 extends in the downward direction –RA into the body portion 108a of the lower hub fairing 108.

Figure 7:
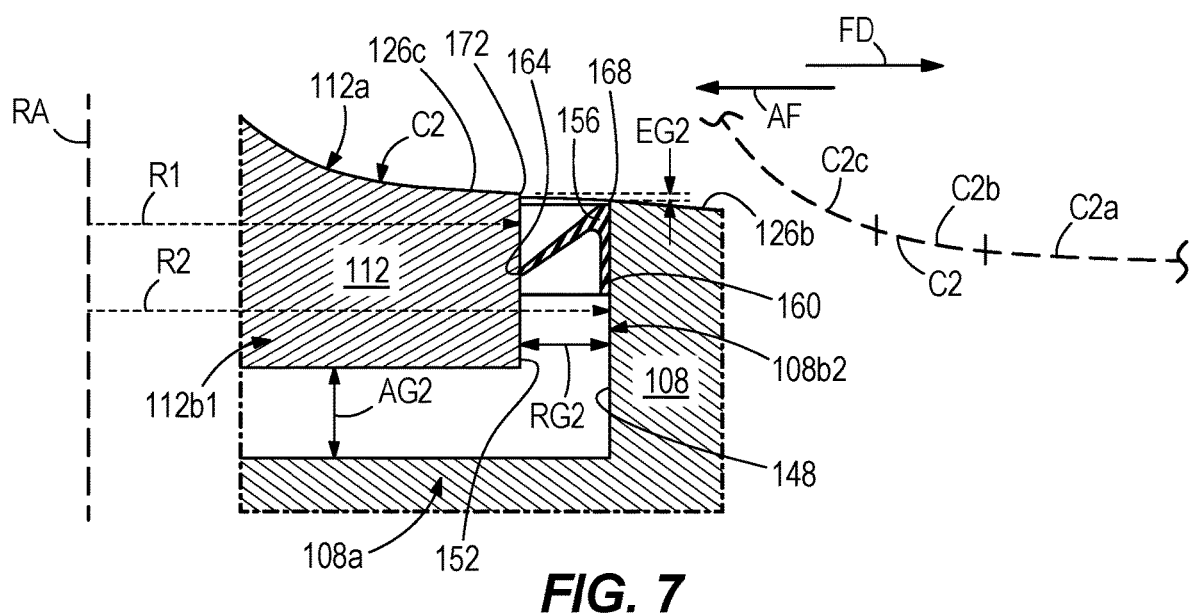
FIG. 7 is an enlarged view of a portion of the rotor assembly taken along section line 7-7 in FIG. 5.

With reference to FIGS. 5 and 7, the shaft fairing 112 includes a first interface portion 112b1 and a second interface portion 112b2. In the illustrated embodiment, the first interface portion 112b1 and the second interface portion 112b2 are each generally cylindrical in shape. The first interface portion 112b1 is configured to be received by the second depression 108b2 of the lower hub fairing 108. The first interface portion 112b1 is positioned closer to the bottom end 100d of the rotor assembly 100 compared to the second interface portion 112b2. The first interface portion 112b1 extends in the downward direction –RA from the body portion 112a of the shaft fairing 112. The first interface portion 112b2 extends in the upward direction +R1 from the body portion 112a of the shaft fairing 112.

Figure 6:
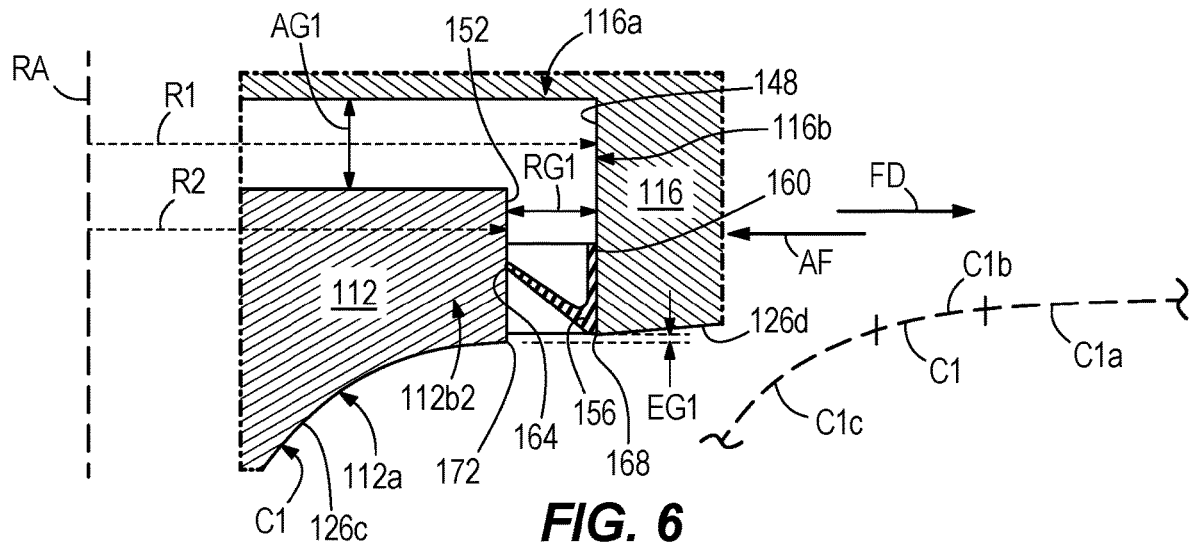
FIG. 6 is an enlarged view of a portion of the rotor assembly taken along section line 6-6 in FIG. 5.

With reference to FIGS. 5 and 6, the upper hub fairing 116 further includes a depression 116b. In the illustrated embodiment, the depression 116b is generally cylindrical in shape. The depression 116b is configured to receive at least a portion of the second interface portion 112b2. The depression 116b extends in the upward direction +RA into the body portion 116a of the upper hub fairing 116.

The geometry of the depressions 108b1, 108b2, 116b generally matches the geometry of the interface portions 104b, 112b1, 112b2. More specifically, a cross-sectional geometry of the depressions 108b1, 108b2, 116b perpendicular to the rotary axis RA generally matches the cross-sectional geometry of the interface portions 104b, 112b1, 112b2. However, other configurations are possible. For example, the interface portions 104b, 112b1, 112b2 may be annularly (i.e., hollow cylindrical) shaped.

FIG. 6 illustrates the second interface portion 112b2 of the shaft fairing 112 being received within the depression 116b of the upper hub fairing 116. An inner surface 148 of the depression 116b is removed from the rotary axis RA by a radius R1. An outer surface 152 of the interface portion 112b2 extends from the rotary axis RA to a radius R2. The radius R1 is greater than the radius R2. Accordingly, a radial gap RG1 is located between the second interface portion 112b2 and the inner surface 148 of the depression 116b.

A seal 156 is positioned in the radial gap RG1. The seal 156 includes an outer tip end 160 that presses against the inner surface 148 of the depression 116b. In the illustrated embodiment, the outer tip end 160 is generally annularly shaped about the rotary axis RA. The seal 156 further includes an inner tip end 164 that presses against the outer surface 152 of the interface portion 112b2. The inner tip end 164 is generally cantilevered from the outer tip end 160, and only a tip of the inner tip end 164 presses against the outer surface 152 of the interface portion 112b2. In the illustrated embodiment, the inner tip end 164 presses against a generally central portion (along the rotational axis RA) of the outer surface 152. Other arrangements for the seal 156 are possible.

An axial gap AG1 extending in a direction parallel to the rotary axis RA is located between the shaft fairing 112 and the upper hub fairing 116. The axial gap AG1 is smaller in size than the depression 116b. A seal (not illustrated) may be positioned within the axial gap AG1. This seal in the axial gap AG1 may work on conjunction with or in replacement of the above-described seal 156 in the radial rap RG1. Other sealing arrangements are possible. The upper hub fairing 116 defines an interface edge 168 at a lowermost (in the illustrated orientation) edge of the depression 116b. Similarly, the shaft fairing 112 defines an interface edge 172 at a lowermost (in the illustrated orientation) edge of the second interface portion 112b2. In the illustrated embodiment, the shaft fairing 112 and the upper hub fairing 116 are shaped such that an edge gap EG1 extending in a direction parallel to the rotary axis RA exists between the interface edges 168, 172. It is envisioned that in some other embodiments, the edge gap EG1 may be minimized to be nonexistent (i.e., the edge gap EG1 may be zero).

The shaft fairing 112 and the upper hub fairing 116 are shaped such that a combination of the shaft fairing 112 and the upper hub fairing 116 define a curve C1 (reproduced adjacent to the shaft fairing 112 and the upper hub fairing 116 for clarity). The curve C1 is approximately continuous in shape. The curve C1 includes a first portion C1a corresponding with the outer surface 126d of the upper hub fairing 116, a second portion C1b positioned between the first portion C1a and a third portion C1b. The third portion C1b corresponds with the outer surface 126c of the shaft fairing 112. The second portion C1b spans the radial gap RG1 between the upper hub fairing 116 and the shaft fairing 112. The ends of the second portion C1b abutting the first portion C1a and the third portion C1c are spaced from each other in a direction parallel to the rotary axis RA in correspondence with the size of the edge gap EG1. Accordingly, the portions C1a-C1c each follow the same curve C1, and airflow is permitted to pass along the outer surfaces 126c-126d without disruption. Accordingly, the curve C1 does not have any discontinuities (i.e., 90 degree turn requirements for airflow) or sudden slopes or acclivities which would otherwise disrupt continuous and uninterrupted airflow along the airflow direction AF. The curve C1 is also concave in shape.

The curve C1 is shaped such that airflow passing along the airflow direction AF is pressed in the downward direction −RA, and can eventually traverse the radial gap RG1 without being required to traverse a height of the second interface portion 112b2. Airflow is passed along the curve C1 and is passed along outer surfaces of each component of the rotor assembly 100 and ultimately along the airframe 14. As illustrated in FIG. 6, with regard to the airflow direction AF, both the upper hub fairing 116 and the body 112a of the shaft fairing 112 adjacent the second interface portion 112b2 are sloped towards the downward direction −RA. The upper hub fairing 116 may be sloped towards the downward direction −RA more than the body 112a such that air traveling along the airflow direction AF traverses the radial gap RG1 without being entrapped therein. As illustrated in FIG. 6, the interface edges 168, 172 are in-line with (i.e., positioned on) the curve C1. As described above, the curve C1 includes the first portion 126c provided by the outer surface 126c of the shaft fairing 112 and the second portion C1c provided outer surface 126d upper hub fairing 116. The interface edges 168, 172 are in-line with (i.e., positioned) on the curve C1 such that airflow passing along the airflow direction AF is passed smoothly (i.e., without generation of undesired turbulence, friction forces, etc.) from adjacent the outer surface 126d of the upper hub fairing 116 to the outer surface 126c of the shaft fairing 112. In some embodiments, while passing from the outer surface 126d of the upper hub fairing 116 to the outer surface 126c of the shaft fairing 112, the airflow passes smoothly at least in part in a direction parallel to the rotation axis RA.

Depending on the application, the curve C1 may be linear, curvilinear, parabolic, etc. In some other embodiments, a portion (e.g., the first portion C1a, the second portion C1b, and/or the third portion C1c) of the curve C1 may be linear, rectilinear, curvilinear, parabolic, etc. In some other embodiments, one portion (e.g., the first portion C1a) may be linear, rectilinear, curvilinear, parabolic, etc., and another portion (e.g., the second portion C1b) may be another from the group selected from linear, rectilinear, curvilinear, parabolic, etc. As discussed above, the edge gap EG1 may be reduced to zero. In such embodiments, the second portion C1b is linear, and extends perpendicularly from the rotation axis RA.

The same is true for the curves C2, C3 as illustrated in FIGS. 7 and 8 as provided by the shaft fairing 112, the lower hub fairing 108, and the pylon fairing 104. The curves C2, C3 also include first, second, and third portions C2a-C3c as described above with regard to the first, second, and third portions C1a-C1c of the curve C1.

FIG. 7 illustrates the first interface portion 112b1 of the shaft fairing 112 being received within the second depression 108b2 of the lower hub fairing 108. This interface is generally the same as the interface of FIG. 6 between the second interface portion 112b2 of the shaft fairing 112 being received within the depression 116b of the upper hub fairing 116. The radial gap RG2, axial gap AG2, and edge gap EG2 illustrated in FIG. 7 are each similar to the corresponding radial gap RG1, axial gap AG1, and edge gap EG1 illustrated in FIG. 6. However, the curve C2 presses airflow passing along the airflow axis AF in the upward direction +RA. The airflow eventually traverses the radial gap RG2 without being required to traverse a height of the first interface portion 112b1. In the illustrated embodiment, the size of the radial gap RG1 is approximately equal to the radial gap RG2. Accordingly, the same seal 156 may be used between both the first interface portion 112b1 and the second depression 108b2 (FIG. 7) as well as between the second interface portion 112b2 and the depression 116b (FIG. 6).

FIG. 8 illustrates the interface portion 104b of the pylon fairing 104 being received within the first depression 108b1 of the lower hub fairing 108. The inner surface 148 of the first depression 108b1 is removed from the rotary axis RA by a radius R3. The outer surface 152 of the interface portion 104b extends from the rotary axis RA by a radius R4. The radius R3 is greater than the radius R4. Accordingly, a radial gap RG3 is located between the first depression 108b1 and the interface portion 104b. The radial gap RG3 is smaller than the radial gaps RG1, RG2. As best shown in FIG. 5, the radii R3, R4 are each greater than the radii R1, R2. Accordingly a thinner seal 176 is provided between the interface portion 104b and the first depression 108b1. Otherwise, the edge gap EG3, curve C3, axial gap AG3, and the remaining structure illustrated in FIG. 8 is similar to the above-described structure of FIG. 6. Otherwise shaped and dimensioned structures may replace and/or work in conjunction with the above-described seals 156, 176 to interconnect the pylon fairing 104, lower hub fairing 108, shaft fairing 112, and upper hub fairing 116. For example, the seals 156, 176 may be replaced by o-rings, square-cut o-rings, quad-cut o-rings, x-shaped o-rings, and the like.

The seal 176 is positioned in the radial gap RG3. The seal 176 includes an outer tip end 180 that presses against the inner surface 148 of the depression 108b1. In the illustrated embodiment, the outer tip end 180 is generally annularly shaped about the rotary axis RA. The seal 176 further includes an inner tip end 184 that presses against the outer surface 152 of the interface portion 104b. The inner tip end 184 is generally cantilevered from the outer tip end 180, and only a tip of the inner tip end 184 presses against the outer surface 152 of the interface portion 104b. In the illustrated embodiment, the inner tip end 184 presses against a generally central portion (along the rotational axis RA) of the outer surface 152. Other arrangements for the seal 176 are possible.

In view of the above-described structure of the rotor assembly 100, the rotor assembly 100 is improved when compared to traditional rotor assemblies having axial clearance between components thereof (e.g., a pylon fairing and a rotary fairing). The rotor assembly 100 is highly aerodynamic, thus provides reduced drag force generated during flight (e.g., during flight along the forward direction FD). Reduced drag decreases an amount of thrust required to counteract the drag. Reduced thrust required allows for increased power efficiency, leading to less load required by the power source 26. This may elongate the lifetime of the power source 26. Additionally, the aircraft 10 including the rotor assembly 100 has increased range and decreased re-fueling requirements, which effectively decreases the operating cost of the aircraft 10 including the rotor assembly 100.

While embodiments disclosed herein primarily refer to a rotor assembly 100 for an aircraft, similar aerodynamic interfaces may be implemented in assemblies which are not aircraft. For example, land and/or water supported vehicles, or other non-vehicular apparatus may employ similar rotor assemblies 100.

Various features and advantages of the embodiments described herein are set forth in the following claims.

What is claimed is:

1. A rotor assembly comprising:
   a fixed fairing including an interface portion, the interface portion defining an outer radial surface of the fixed fairing,
   a hub fairing including a depression configured to receive at least a portion of the interface portion, the hub fairing being rotatable relative to the fixed fairing, the depression defining an inner radial surface of the hub fairing, and
   a seal interposed within a radial gap defined between the outer radial surface of the fixed fairing and the inner radial surface of the hub fairing such that the seal presses against the outer radial surface of the fixed fairing and the inner radial surface of the hub fairing.

2. The rotor assembly of claim 1, wherein
   the fixed fairing defines a first interface edge,
   the hub fairing defines a second interface edge, and
   the first interface edge and the second interface edge are each positioned on a curve defined in part by an outer surface of the fixed fairing and an outer surface of the hub fairing.

3. The rotor assembly of claim 2, wherein the first interface edge and the second interface edge are spaced from one another by an edge gap.

4. The rotor assembly of claim 3, wherein the curve is approximately continuous and includes a portion spanning the fixed fairing and the hub fairing, the portion having ends spaced from each other an amount corresponding with a size of the edge gap.

5. The rotor assembly of claim 3, wherein the hub fairing is rotatable about a rotation axis, and the curve includes a linear portion spanning the fixed fairing and the hub fairing, the linear portion extending perpendicularly from the rotation axis.

6. The rotor assembly of claim 1, wherein the depression receives the interface portion with an axial gap being positioned between the hub portion adjacent the depression and the interface portion.

7. An aircraft comprising:
   an airframe;
   a power source configured to generate power;
   a gearbox coupled to the power source and a drive shaft;
   a fairing fixed to the airframe, the fixed fairing including an interface portion defining an outer radial surface of the fixed fairing;
   a hub fairing including a depression configured to receive at least a portion of the interface portion, the hub fairing being coupled to the drive shaft for rotation therewith relative to the fixed fairing, the depression defining an inner radial surface of the hub fairing; and
   a seal interposed within a radial gap defined between the outer radial surface of the fixed fairing and the inner radial surface of the hub fairing such that the seal presses against the outer radial surface of the fixed fairing and the inner radial surface of the hub fairing.

8. The aircraft of claim 7, wherein the hub fairing is a first hub fairing, and wherein the aircraft further comprises a second hub fairing coupled to the drive shaft for rotation therewith about a second direction relative to the fixed fairing, the second hub fairing including a second depression, and wherein the fixed fairing is a shaft fairing having a second interface portion, the second depression being configured to receive at least a portion of the second interface portion.

9. The aircraft of claim 8, wherein the rotation of the second hub fairing about the second direction opposes the rotation of the first hub fairing.

10. The aircraft of claim 7, wherein airflow passes along an airflow direction that moves along a curve defined in part by the outer surface of the fixed fairing and the outer surface of the hub fairing.

11. The aircraft of claim 10, wherein the curve is continuous.

12. The aircraft of claim 10, wherein the fixed fairing defines a first interface edge, the hub fairing defines a second interface edge, the first interface edge and the second interface edge being in-line with the curve.

13. A rotor assembly comprising:
   a fixed fairing including an interface portion,
   a first hub fairing including a first depression and a second depression,
   a fixed shaft fairing including a first interface portion and a second interface portion,
   a second hub fairing including a depression,
   wherein the depression of the second hub fairing is configured to receive at least a portion of the second interface portion of the fixed shaft fairing,
   the second depression of the first hub fairing is configured to receive at least a portion of the first interface portion of the shaft fairing,
   the first depression of the first hub fairing is configured to receive at least a portion of the interface portion of the fixed fairing, the fixed fairing is fixed relative to the fixed shaft fairing, and the first hub fairing and the second hub fairing are rotatable relative to the fixed fairing and the fixed shaft fairing.

14. The rotor assembly of claim 13, further comprising a first seal interposed between the fixed fairing and the first hub fairing, a second seal interposed between the first hub fairing and the fixed shaft fairing, and a third seal interposed between the fixed shaft fairing and the second hub fairing.

15. The rotor assembly of claim 13, wherein the fixed fairing defines a first interface edge and the first hub fairing defines a second interface edge, the first interface edge and the second interface edge being contiguous with a curve defined by the fixed fairing and the first hub fairing.

16. The rotor assembly of claim 14, wherein the first hub fairing and the second hub fairing are rotatable about a rotational axis, and the shaft fairing includes a flared portion having variable height in a direction along the rotational axis.

17. The rotor assembly of claim 13, wherein the first hub fairing and the second hub fairing are rotatable in opposite directions.

* * * * *